Jan. 4, 1949.    C. M. SCUDDER    2,457,927
CLOSURE FOR PRESSURE VESSELS
Filed May 3, 1945
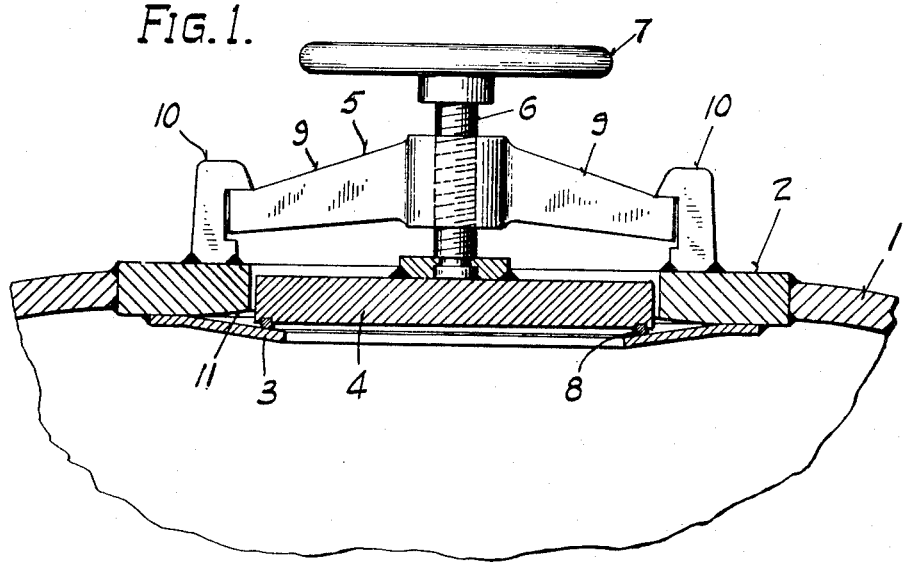
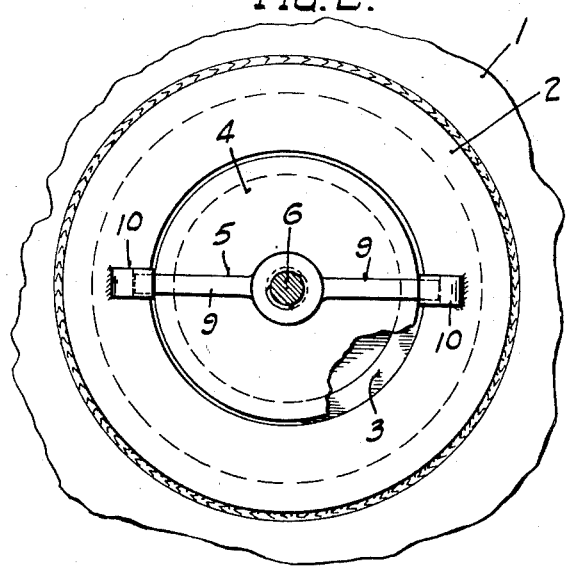
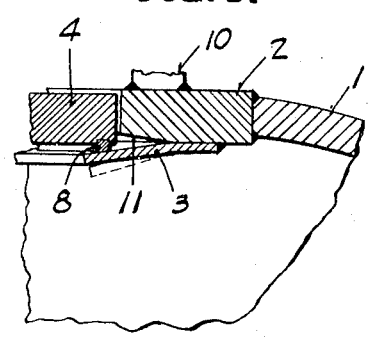
Charles M. Scudder
INVENTOR.
BY
ATTORNEY.

Patented Jan. 4, 1949

2,457,927

UNITED STATES PATENT OFFICE 2,457,927

CLOSURE FOR PRESSURE VESSELS

Charles M. Scudder, Wauwatosa, Wis., assignor to A. O. Smith Corporation, Milwaukee, Wis., a corporation of New York Application May 3, 1945, Serial No. 591,799

5 Claims. (Cl. 220—57)

This invention relates to closures for vessels and has particular reference to a manway closure to be employed in pressure vessels having high internal pressure in service.

The principal object of the invention is to provide a simple and inexpensive closure unit that utilizes the internal pressure of the vessel for sealing the closure opening.

These and other objects will be clear from the following description of an embodiment of the invention illustrated in the accompanying drawing:

In the drawing:

Figure 1 is a sectional view through the wall of the vessel and the closure unit of the invention as the unit appears under clamping pressure;

Fig. 2 is a top plan view of the closure as the latter appears in Figure 1, reduced in size, and with a portion of the cover broken away to expose the seat; and Fig. 3 is a similar view with the seat of the cover moved outwardly by internal fluid pressure.

The pressure vessel shell 1 has a circular reinforcing collar 2 welded therein and encircling a manway opening in the shell. A flexible resilient flat metal ring 3 is welded at its outer circumference to the collar 2 and extends inwardly therefrom into the manway opening.

A cover 4 is disposed loosely in the manway opening and held in position by the bail 5 and central screw stud support 6. The axial position of the cover 4 may be determined by the threading of the screws 6 by hand wheel 7.

When in position for sealing the pressure vessel, the cover 4 is seated upon the inner protruding edge of ring 3. A gasket 8 is disposed between ring 3 and cover 4 and is compressed to seal the closure by reason of the clamping pressure of cover 4 against ring 3 and of the internal fluid pressure biasing ring 3 outwardly against the cover 4.

The bail 5 constitutes a spider having the ends of its radial spokes 9 inserted in hook-shaped brackets 10 welded to the outer surface of collar 2. Removal of the cover after release of internal fluid pressure is easily effected by releasing the clamping pressure of screw 6 and then turning the bail 5 until its spoke ends are free from the brackets 10.

If desired, the inner corner of collar 2 may be tapered off as shown to provide a recess 11 for greater flexing movement of ring 3 under internal fluid pressures. This is particularly useful where the ring 3 is flat and not dished.

In ordinary service position the cover 4 will be clamped within the manway with sufficient pressure to flex or force the flexible ring 3 inwardly from the normal position thereof to pre-load the same.

With exertion of pressure against the cover 4 by the contents of the vessel, the cover 4 yields outwardly. The flexible ring 3 flexed inwardly under initial loading pressure follows the cover outwardly in tight engagement therewith and maintains the seal therebetween to prevent leakage of the contents of the tank.

The tapered bottom inner edge recess 11 of the reinforcing ring 2 permits freedom of movement of flexible ring 3 as it follows cover 4 outwardly since the ring 3 under tendency to move outwardly due to initial loading as described and under pressure from the contents of the vessel may move to a position outwardly from the normal position it obtains before the cover is clamped in place.

In any event the ring 3 is held in close engagement with the cover 4 at all times to seal the contents of the vessel from leakage through the manway closure.

The invention provides a simple and inexpensive closure for a vessel opening.

Various embodiments of the invention may be employed within the scope of the accompanying claims.

I claim:

1. A closure for a manway opening in the wall of a vessel or the like confining fluid under pressure, which comprises a reinforcing ring welded within the manway opening to reinforce the vessel adjacent said opening, a flexible plate-like ring member having its outer edge portion welded to the reinforcing ring and its inner edge portion freely disposed and projecting within the manway opening, a cover seated on said flexible ring and provided to close the opening in the vessel, and a bail assembly secured to said reinforcing ring and to the center of said cover to hold said cover seated on the flexible ring and flex the latter inwardly to pre-load the ring so that it follows the cover and maintains a seal therebetween as the cover yields outwardly under pressure from the fluid confined in the vessel.

2. A closure for a manway opening in the wall of a vessel confining fluid under pressure, which comprises a reinforcing ring welded within the manway opening to reinforce the vessel adjacent the opening, said ring being tapered at the bottom inner edge portion to less thickness at the inner edge thereof, a thin flexible plate-like ring member secured to the bottom of the reinforcing ring and projecting into the manway opening, a cover seated on the projecting edge portion of said thin ring to close said opening, and means to clamp said cover against said thin ring with the latter being sufficiently flexible to be forced inwardly from normal position by the cover when the latter is clamped in place and to follow the cover outwardly past normal position as pressure forces the same to yield outwardly, the tapered bottom inner edge portion of the reinforcement ring providing for substantial freedom of movement of said flexible ring.

3. A closure for a manway opening in the wall of a vessel or the like confining fluid under pressure, which comprises a flexible plate-like ring extending transversely into said opening in the vessel, with the inner edge portion of the ring disposed to flex freely within said opening, a cover seated on said ring to close said opening, a gasket member disposed between the free edge of the ring and cover to effect a seal therebetween, and means to hold the cover against said ring to compress said gasket therebetween and flex the ring inwardly to thereby pre-load the same so that it will follow the cover and effect a seal therewith as the latter is forced to yield outwardly by internal fluid pressure.

4. A closure for an opening in the wall of a vessel or the like confining fluid under pressure which comprises a flexible ring having its outer edge portion welded to the inside of the wall of the vessel around said opening and its inner edge portion freely disposed and projecting within the opening, a cover seated on said flexible ring and provided to close said opening in the vessel, and a bail assembly secured to the wall of the vessel surrounding the opening and to said cover to hold the cover seated on the flexible ring and flex the ring inwardly to pre-load the ring so that it follows the cover and maintains a seal therebetween as the cover yields outwardly under pressure from the fluid confined in the vessel.

5. A closure for an opening in the wall member of a vessel or the like confining fluid under pressure which comprises a cover member for said opening to close the same, a flexible ring disposed to provide a seal encircling the opening and having one of the edge portions thereof overlapping one of said members for a substantial distance and welded thereto and the other of said edge portions overlapping the other of said members for a substantial distance and free to flex in cooperation with relative movement between said members, a gasket disposed between the free edge portion of the ring and member with which the free edge portion cooperates, and means for stressing said flexible ring axially of said opening in a direction to maintain the seal, the internal fluid pressures of the confined fluid additionally serving to bias said ring in a direction to maintain a seal of the opening when the cover is in place.

CHARLES M. SCUDDER.

REFERENCES CITED

The following references are of record in the file of this patent:

UNITED STATES PATENTS

| Number | Name | Date |
|---|---|---|
| 588,063 | Hewens | Aug. 10, 1897 |
| 1,543,742 | Babitzky | June 30, 1925 |
| 2,009,877 | Dodd | July 30, 1935 |
| 2,239,912 | Fischer | Apr. 29, 1941 |
| 2,278,881 | Jacocks | Apr. 7, 1942 |
| 2,386,293 | Clements | Oct. 9, 1945 |